(12) United States Patent
Isobe

(10) Patent No.: US 6,608,553 B2
(45) Date of Patent: Aug. 19, 2003

(54) REMOTE VEHICLE MONITORING SYSTEM AND VEHICLE-MOUNTED DEVICE THEREFOR

(75) Inventor: Norihiro Isobe, Tokai (JP)

(73) Assignee: Denso Corporation, Kariya (JP)

( * ) Notice: Subject to any disclaimer, the term of this patent is extended or adjusted under 35 U.S.C. 154(b) by 91 days.

(21) Appl. No.: 09/945,819

(22) Filed: Sep. 5, 2001

(65) Prior Publication Data

US 2002/0036566 A1 Mar. 28, 2002

(30) Foreign Application Priority Data

Sep. 27, 2000 (JP) ........................................ 2000-294458

(51) Int. Cl.$^7$ ............................................. B60R 25/10
(52) U.S. Cl. ........................ 340/426; 340/988; 342/457; 455/422
(58) Field of Search ................................. 340/426, 539, 340/5.8, 988; 342/457; 455/422, 550, 99

(56) References Cited

U.S. PATENT DOCUMENTS

| | | | | |
|---|---|---|---|---|
| 5,497,149 A | * | 3/1996 | Fast | 340/988 |
| 5,515,043 A | * | 5/1996 | Berard et al. | 340/988 |
| 5,515,285 A | * | 5/1996 | Garrett, Sr. et al. | 340/426 |
| 5,673,305 A | * | 9/1997 | Ross | 340/426 |
| 5,777,580 A | * | 7/1998 | Janky et al. | 342/457 |
| 6,184,801 B1 | * | 2/2001 | Janky | 340/988 |

FOREIGN PATENT DOCUMENTS

| | | |
|---|---|---|
| JP | 10-32650 | 2/1988 |
| JP | 2-286450 | 11/1990 |
| JP | 10-81205 | 3/1998 |
| JP | 2-2955702 | 7/1999 |
| JP | 2000-231683 | 8/2000 |

* cited by examiner

Primary Examiner—Brent A. Swarthout

(57) ABSTRACT

A stolen-vehicle monitoring system monitors a present position of a stolen-vehicle via radio communication between a monitor station and a vehicle-mounted device. When the vehicle-mounted device detects a vehicle theft, it automatically interrupts on-going communication between a car phone of the stolen-vehicle and an external phone if the car phone is being used for other than the monitor station and for low priority processing, and then dials to the monitor station to transmit present position information of the stolen-vehicle. When the monitor station calls the vehicle-mounted device, it interrupts on-going communication of the car phone and switches the communication to the monitor station to transmit the present position information to the monitor station.

13 Claims, 4 Drawing Sheets

1

REMOTE VEHICLE MONITORING SYSTEM AND VEHICLE-MOUNTED DEVICE THEREFOR

CROSS REFERENCE TO RELATED APPLICATION

This application incorporates herein by reference Japanese Patent Application No. 2000-294458 filed Sep. 27, 2000.

BACKGROUND OF THE INVENTION

The present invention relates to a remote vehicle monitoring system and a vehicle-mounted device therefor.

Various remote monitoring systems are proposed for monitoring stolen-vehicles at remote monitoring stations by the use of radio communication with vehicle-mounted car phones (mobile phones). For instance, in JP 2955702, a stolen-vehicle monitoring station transmits a call signal and a car phone of a stolen-vehicle automatically transmits a response signal including its present position information in response to the call signal.

However, the above radio communication between the monitoring station and the stolen-vehicle is disabled, if the car phone is kept used by an unauthorized user who stole the vehicle. The same problem occurs when the stolen-vehicle leaves away from a communication zone of the car phone. The monitoring station will have to continue to transmit a call signal, if a response from the car phone is desired immediately when the car phone becomes available again or the vehicle enters the communication zone of the car phone again.

SUMMARY OF THE INVENTION

It is therefore an object of the present invention to provide a remote vehicle monitoring system, which maximizes radio communications between a vehicle and a remote monitoring station.

According to the present invention, a vehicle monitoring system comprises a monitor station and a vehicle-mounted device, which perform radio communication therebetween. The vehicle-mounted device specifies its present position while in travel. When a vehicle theft occurs, the vehicle-mounted device interrupts on-going communication with an opponent when the opponent is other than the monitor station and connect to the monitor station for transmitting the present position of the stolen-vehicle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
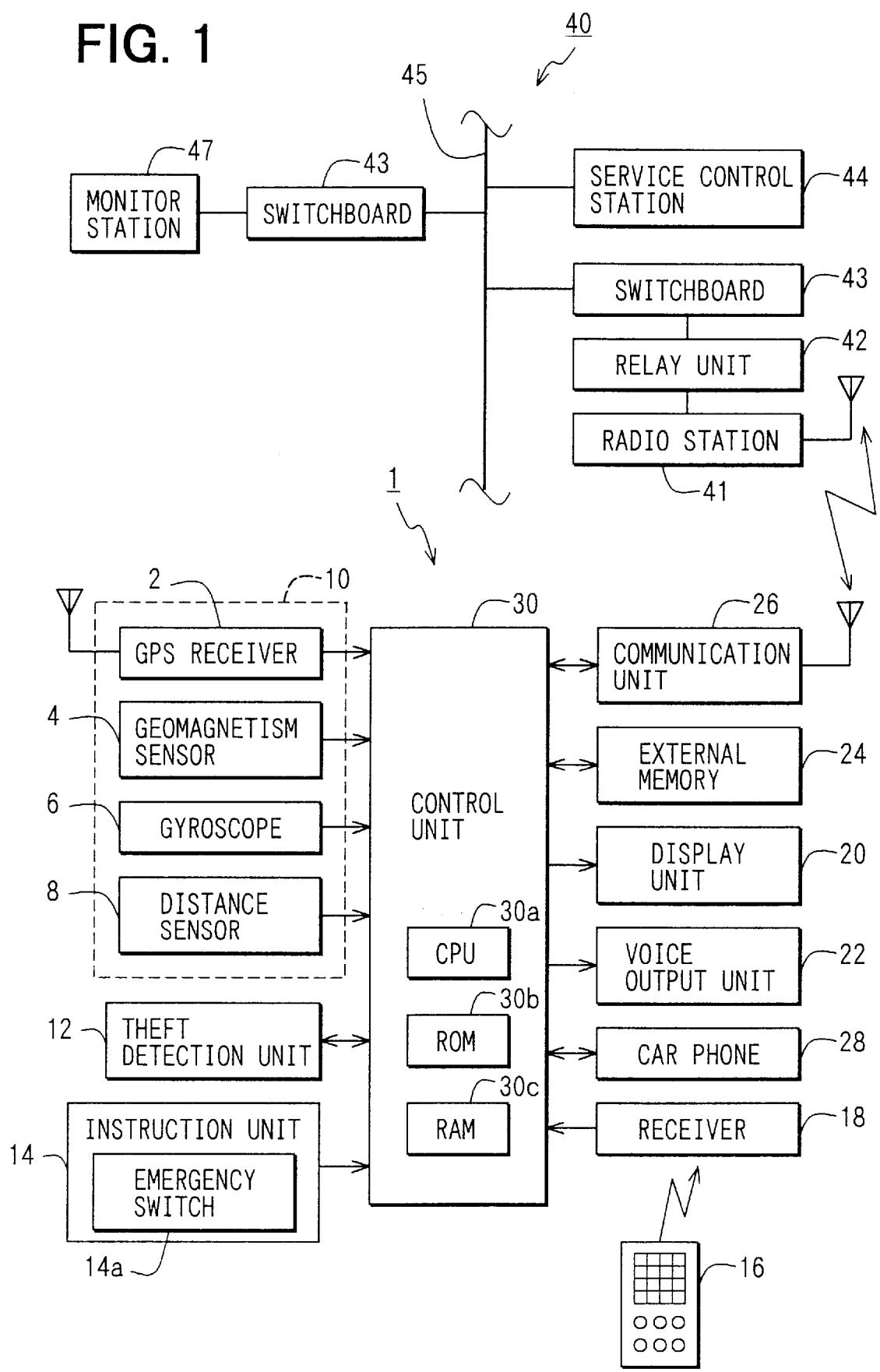
FIG. 1 is a block diagram showing a remote vehicle monitoring system according to an embodiment of the present invention.

Referring first to FIG. 1, a remote vehicle monitoring system includes a vehicle-mounted device 1. This device 1 includes a position detection unit 10 for detecting a present position of a vehicle, a theft detection unit 12 for detecting theft (unauthorized use) of a vehicle, and an instruction unit 14 for instructing various operations through manual operations of switches and the like by a vehicle user.

The device 1 further includes a remote controller 16, a receiver 18 for the remote controller 16, a display unit 20 for displaying various information and images, a voice output unit 22 for providing voiced outputs, a communication unit 26 for radio communication with a radio station 41 of a ground public phone network 40, and a transmitter/receiver unit (car phone) 28 for communication with phones in the ground public phone network 40 through the communication unit 26. The device 1 further includes a control unit 30 connected to those units for providing a vehicle travel navigation and other functions, and an external memory 24 for storing various information to be used by the control unit 30.

The position detection unit 10 comprises a GPS receiver 2 for detecting position, direction, speed and the like of the vehicle by receiving radio signals from a global positioning system (GPS) satellite, a geomagnetism sensor 4 for detecting absolute direction of the vehicle by the use of geomagnetism, a gyroscope 6 for detecting a turning motion of the vehicle, a distance sensor (speed sensor) 8 for detecting a travel distance of the vehicle, and the like. The control unit 30 calculates a present position of the vehicle from output signals of the position detection unit 10.

The theft detection unit 12 is constructed to detect the theft of the vehicle by detecting that the vehicle is operated without a normal vehicle key (engine ignition key). The theft detection unit 12 outputs a theft detection signal when the vehicle is operated without inserting the vehicle key into a key cylinder.

The control unit 30 comprises a CPU 30a, a ROM 30b, a RAM 30c and the like. The control unit 30 is programmed to perform a stolen-vehicle monitoring operation when the theft detection signal is applied from the theft detection unit 12. In this operation, the control unit 30 is connected to a remote monitor station 47 through the communication unit 26 and the radio station 41 of the ground phone network 40, and transmits a vehicle monitoring signal including present position information and identification signal of the vehicle. The control unit 30 is also programmed to perform the similar stolen-vehicle monitoring operation when a call signal including vehicle theft information is received from the monitor station 47. That is, the control unit 30 transmits the stolen-vehicle monitoring signal as a response to the call signal from the monitor station 47.

The instruction unit 14 has various instruction switches including an emergency switch 14a. A similar emergency switch is also provided on the remote controller 16. The control unit 30 is also programmed to perform an emergency operation. In this operation, the control unit 30 transmits a rescue request signal to an emergency rescue station (not shown) through the communication device 26 and the ground public phone network 40 when an emergency signal is applied from the instruction unit 14. The control unit 30 displays on the display unit 20 messages transmitted from the emergency rescue station in response to the rescue request signal. The monitor station 47 may include therein the emergency rescue station.

In the ground public phone network 40, the radio station 41 is connected to a switchboard 43 through a relay unit 42. The is switchboard 43 is connected to a service control station 44 through a common signal network 45. The service control unit 44 directs radio signals transmitted from the communication device 26 and received through the ratio station 41, relay unit 42, switchboard 43 and the common signal network 45 to corresponding phones (not shown), respectively. The monitor station 47 has one of these phones therein. In this embodiment, the communication device 26 of the vehicle-mounted device 1 and the radio station 41 of the ground public phone network 40 constitute one radio phone system. If a radio phone (communication device 26) moves from one communication zone of the radio station 41 to another communication zone of another radio station (not shown), the location of the radio phone (communication unit 26) is registered in the new radio station. Thus, even when the communication unit 26 moves from the communication zone of the radio station 41 to another in the course of communication with a specific phone in the network 40, the communication unit 26 is held connected to the same specific phone in the network 40.

The theft detection unit 12, communication unit 26 and control unit 30 are connected to a storage battery (not shown) of the vehicle to be operable irrespective of operation of the vehicle. Thus, the vehicle theft can be detected when the vehicle is operated without using the vehicle key, and an incoming call from the outside can be received even when the vehicle is not in operation, that is, even when it is left unattended. The ROM 30*b* of the control unit 30 stores the phone number of the monitor station 47 so that the control unit 30 may check whether the incoming call is from the monitor station 47. The control unit 30 executes a minimum required operation when the vehicle is not in operation. For instance, the control unit 30 automatically turns on an ignition switch of the vehicle so that all the sensors and units of the vehicle-mounted device 1 are rendered operative, when the theft detection signal or the incoming call is received from the theft detection circuit 12 or the communication unit 26.

Figure 2:
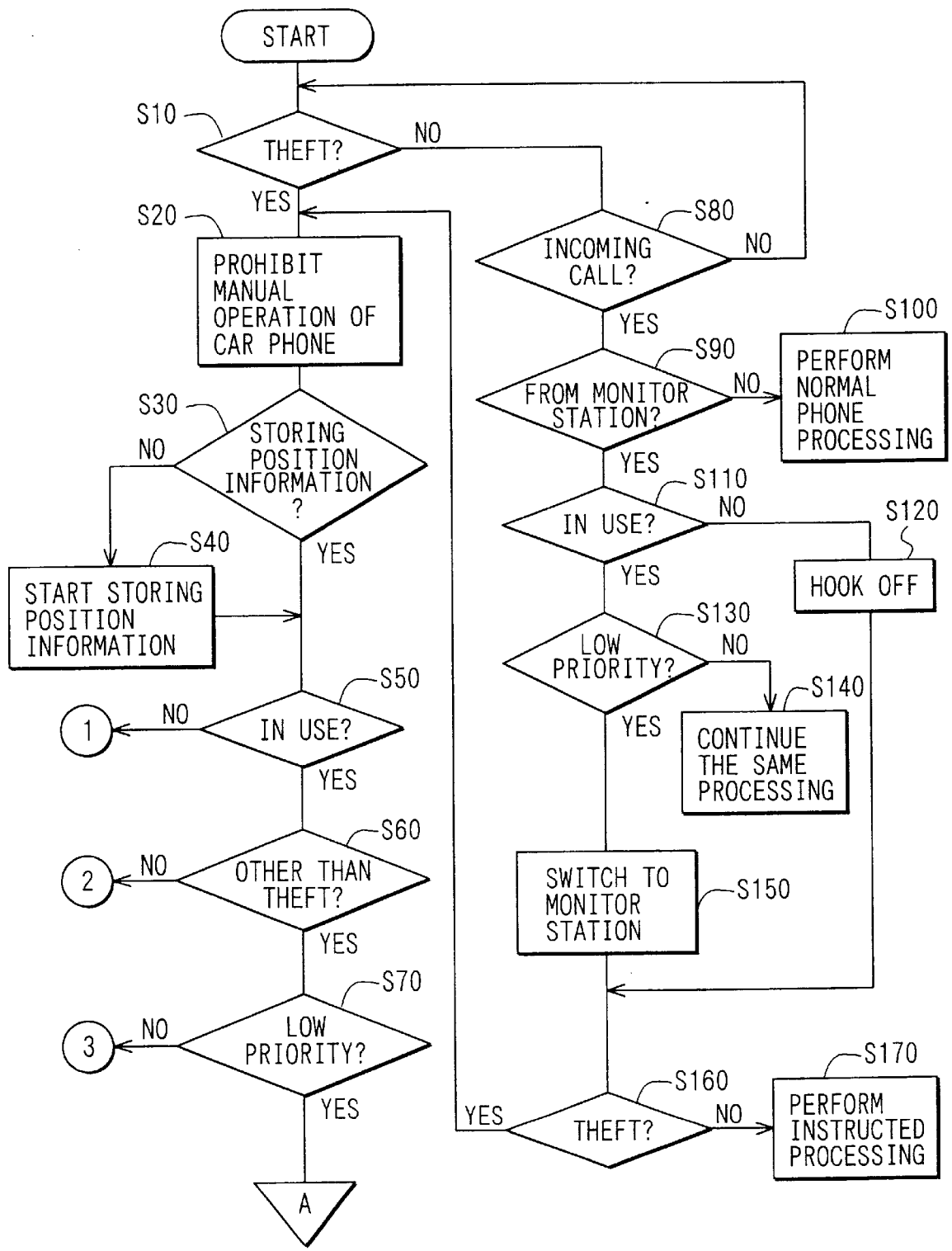
FIG. 2 is a flow diagram showing a part of a routine executed by a vehicle-mounted control unit in the embodiment.
Figure 3:
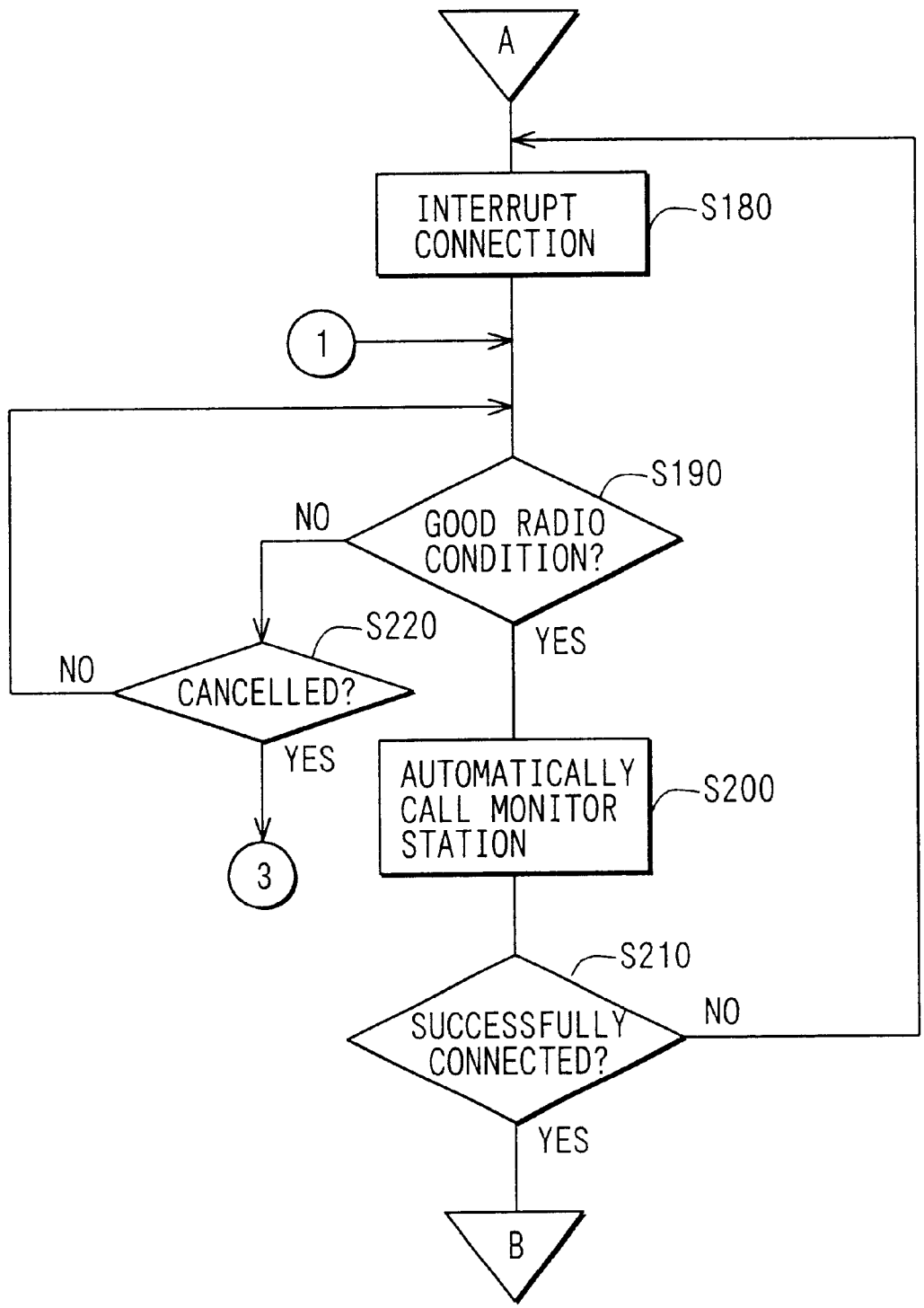
FIG. 3 is a flow diagram showing another part of the routine executed by the vehicle-mounted control unit in the embodiment.
Figure 4:
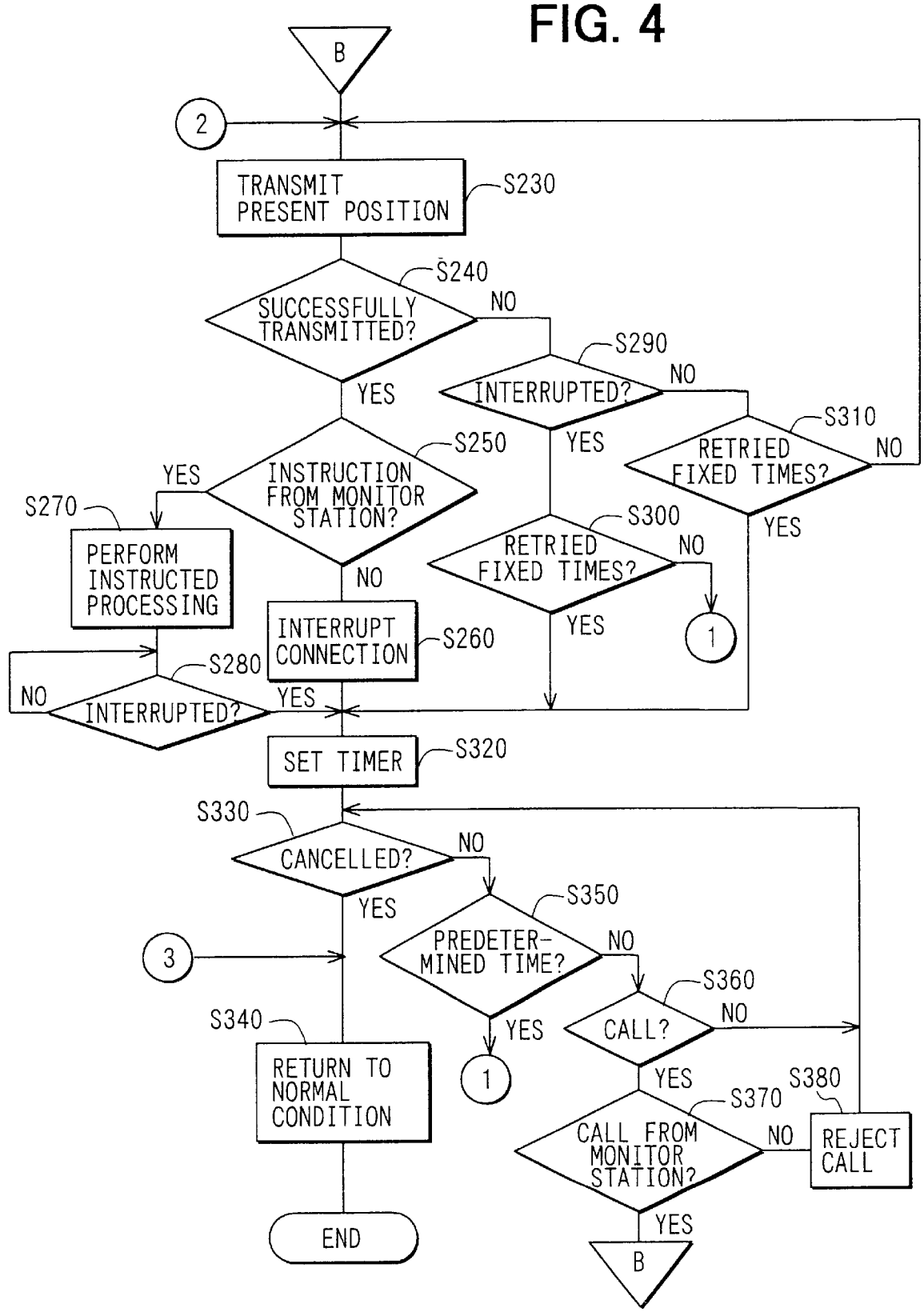
FIG. 4 is a flow diagram showing the other part of the routine executed by the vehicle-mounted control unit in the embodiment.

The control unit 30 is programmed to execute a control routine shown in FIGS. 2, 3 and 4 for the above operation.

As shown in FIG. 2, the control unit 30 first checks at step (S) 10 whether a vehicle theft is detected. If the theft detection signal is applied (YES at S10), the control unit 30 prohibits a vehicle user from manually operating the car phone 28 of the vehicle at S20. That is, the car phone 28 is disabled to be operated, even if a user manually operates the instruction unit 14 and the remote controller 16 to use the car phone 28. In this prohibition operation, any unauthorized manipulation such as interruption of communication with the monitor station 47 or interruption of power supply from the battery to the car phone 28 and the like.

The control unit 30 checks at S30 whether the present position is being retrieved or calculated and stored. Because the position detection unit 10 operates while the power supply is continued from the battery through the ignition switch, the control unit 30 checks whether the ignition switch is turned on. If the ignition switch is turned off (NO at S30), the control unit 30 starts retrieving and storing the present position information at S40.

If no theft detection signal is applied from the position detection unit 10 (NO at S10), the control unit 30 checks at S80 whether an incoming call is received. The control unit 30 repeats S10 and S80, if no incoming call is received (NO at S80). If the incoming call is received (YES at S80), the control unit 30 checks at S90 whether the incoming call is from the monitor station 47. The phone number of the monitor station 47 is stored in the ROM 30*b*. The control unit 30 performs normal phone processing at S100, if the incoming call is from other than the monitor station 47 (NO at S90). In this normal phone processing, the car phone 28 rings and is enabled to operate as usual with the power supply from the battery when hooked off by the user.

If the incoming call is from the monitor station 47 (YES at S90), the control unit 30 checks at S110 whether the car phone 28 is in use. If not in use (NO at S110), the car phone 28 is hooked off to receive the incoming call. If in use (YES at S110), the control unit 30 checks at S130, whether the present phone processing is of predetermined low priority. If the priority is high (NO at S130), the control unit 30 continues the same phone processing of high priority at S140. If the priority is low (YES at S130), the control unit 30 switches the connection of the car phone 28 to the monitor station 47 at S150 for communication with the monitor station 47.

The level of priority is predetermined by whether the use of the car phone 28 is more important or imminent than the vehicle theft. For instance, an emergency of a vehicle such as a traffic accident or passenger's sickness is predetermined to be a high priority case. If the car phone 28 is used in response to the operation of the emergency switch 14*a* to transmit the present vehicle position, vehicle identification information and the like for requesting an emergency rescue, it is determined to be the high priority use. It is also determined to be the high priority use if the car phone 28 is used for communication with a specified phone such as a police station (phone number 110 in Japan) or a fire department (phone number 119 in Japan), which is used in the case of emergency.

The control unit 30 then checks at S160 whether the call from the monitor station 47 is a notice of the vehicle theft. This incoming call will occur when a vehicle user tells the monitor station 47 that his/her vehicle is stolen by probably using a normal vehicle key. In this instance, the theft detection unit 12 does not detect the theft because the vehicle is operated with the normal key.

If the incoming call is the notice of such a vehicle theft (YES at S160), the control unit 30 executes S20, S30 and S40 as described above so that manual operation of the car phone 28 is prohibited and the present position is stored. Thereby, it is made possible to monitor travel of the stolen vehicle through communication with the monitor station 47.

The control unit 30 checks at S50 whether the car phone 28 is being used for the ongoing communication. If it is in use (YES at S50), the control unit 30 further checks at S60 whether the car phone 28 is being used for other than informing the vehicle theft. If it is other than informing the vehicle theft (YES at S60), the control unit 30 checks at S70 whether the use is of a low priority in the similar manner as at S130.

If the use is of the low priority (YES at S70), the control unit 30 interrupts the present connection of the car phone 28 and hence ongoing communication at S180 shown in FIG. 3. After this interruption (S180) or determination of non-use of the car phone 28 (NO at S50), the control unit 30 checks at step S190 whether the radio communication condition (radio wave propagation condition) is good. If it is not good (NO at S190), the control unit 30 checks at S220 whether the vehicle theft information has been cancelled. If not cancelled (NO at S220), the control unit 30 repeats S190. If the radio communication condition is good (YES at S190), the control unit 30 automatically calls the monitor station 47 at S200. If this call is not successfully connected (NO at S210), the control unit repeats S180. If it is successfully connected (YES at S210) or the use of the car phone 28 is for transmitting the vehicle theft information to the monitor station 47 (NO at S60), the control unit 30 executes S230 shown in FIG. 4 to transmit the present position of the vehicle stored at S40.

After transmitting the present position information at S230, the control unit 30 checks at S240 whether the information has been successfully transmitted. If it is successful (YES at S240), the control unit 30 checks at S250 whether any instruction has been transmitted from the monitor station 47. If there is no instruction (NO at S250), the control unit 30 interrupts the connection with the monitor station 47 at S260. If there is some instruction from the monitor station 47 (YES at S250), the control unit 30 performs instructed processing at S270 and waits until the communication is interrupted from the monitor station 47 (YES at S280).

If the present position information has not been successfully transmitted (NO at S240), the control unit 30 retries the transmission. That is, as long as the connection is not interrupted (NO at S290) and the number of retrial is less than fixed number of times, the control unit 30 repeats transmission of the present position information (S230).

If the connection is interrupted (YES at S290) and the number of retrial is less than the fixed number of times (NO at S300), the control unit 30 repeats S190 (FIG. 3) as described above. If the transmission has been retried the fixed number of times (YES at S310 and S320) irrespective of connection with the monitor station 47, the control unit 30 executes S320. The control unit 30 also executes S320 following S260 and S280.

The control unit 30 sets a timer at S320 to determine a time interval from the present transmission to the next transmission. This time interval is settable by the monitor station 47. The control unit 30 then checks at S330 whether the vehicle theft information has been cancelled. If cancelled (YES at S330, YES at S220) or the car phone 28 is in the high priority use (NO at S70), the control unit 30 returns to the normal condition at S340. The control unit 30 thus cancels the above stolen-vehicle monitoring mode and enables the normal use of the car phone 28.

If the vehicle theft information has not been cancelled yet (NO at S330), the control unit 30 checks at S350 whether a predetermined time set in the timer at S320 has elapsed. If it has elapsed (YES at S350), the control unit 30 repeats S200 to automatically call the monitor station 47 again through S190 as a retrial of vehicle theft information transmission. If the predetermined time has not elapsed (NO at S350), the control unit 30 checks at S360 whether any call is received. If there is no call (NO at S350), the control unit 30 repeats the above operation from S330. If there is a call (YES at S360), the control unit 30 checks at S370 whether the call is from the monitor station 47. If it is from the monitor station 47 (YES at S370), the control unit 30 transmits the vehicle theft information at S230. If it is not from the monitor station 47, the control unit 30 rejects the call at S380 and repeats the above operation from S330.

This call rejection operation at S380 is interruption (on-hooking) processing, by which the phone number of the call issuing phone is checked and the phone is automatically hooked if the phone number is not the pre-stored one, for instance, not the phone number of the monitor station 47. Because this operation can be set without ringing, this processing can be done without being noticed by an unauthorized vehicle user.

The above embodiment provides the following advantages in addition to automatic monitoring of the position of the stolen-vehicle at the monitor station 47.

(1) When the theft detection unit 12 detects the theft (YES at S10) and the unauthorized user uses the car phone 28 (YES at S50), the ongoing communication of the car phone 28 at that time is interrupted (S180) if the car phone 28 is used for other than informing of the theft (YES at S60) or for low priority processing (YES at S70). Then, the vehicle-mounted device 1 calls the monitoring station 47 automatically (S200) and transmits the present position information (S230).

When the call from the monitor station 47 in response to the vehicle owner's information of the vehicle theft is received (YES at S90) and the car phone 28 is in use at that time (YES at S110), the connection of the car phone 28 is interrupted and switched to the monitor station 47 if the car phone 28 is being used for low priority processing. The vehicle-mounted device 1 automatically transmits the present position information to the monitor station 47 (S230).

(2) When the vehicle theft is detected by the theft detection unit 12 (YES at S10) or informed from the monitor station 47 (YES at S160), manual operation of the car phone 28 is prohibited (S20). That is, not only the use of the car phone 28 is disabled, but also interruption of the communication with the monitor station 47 or of power supply for the communication is is disabled. As a result, chances of communication with the monitor station 47 are maximized to improve the stolen-vehicle monitoring operation.

In the stolen-vehicle monitoring operation, the monitor station 47 accesses the vehicle-mounted device 1 or vice versa so that the vehicle present position is reported to the monitor station 47. Unless the vehicle theft information is cancelled (NO at S220, YES at S330), the manual operation inhibition (stolen-vehilce monitoring mode) is continued by rejecting calls from other than the monitor station 47 (S380). Thus, the communication between the vehicle-mounted device 1 and the monitor station 47 is ensured.

(3) Generating calls to external phones and receiving calls from external phones are basically disabled in the stolen-vehicle monitoring operation. However, if the communication with other than the monitor station 47 is necessitated for certain emergency cases of higher priority such as traffic accidents or sickness, the communication with the external phones are enabled. Thus, appropriate actions can be taken in emergency cases even in the course of monitoring the stolen vehicle.

(4) The vehicle-mounted device 1 does not transmit the present position information until the vehicle theft information is cancelled (NO at S220), when the communication with the monitor station 47 is interrupted due to poor radio communication condition. When the radio communication condition is improved (YES at S190), the vehicle-mounted device 1 automatically dials to the monitor station 47 (S200) and transmits the present position information (S230). Because the improvement in the radio communication condition is not directly recognized at the side of the monitor station 47, it is preferred to access the monitor station 47 from the vehicle-mounted device 1.

(5) The communication unit 26 is continuously supplied with electric power from the battery to be operable even when the stolen-vehicle is held unattended with the ignition switch being held turned off. If the monitor station 47 calls the vehicle-mounted device 1 when the vehicle is at rest, the control unit 30 turns on the ignition switch so that the present position information may be determined (S40) and transmitted to the monitor station 47 (S230). As a result, the monitor station 47 is enabled to monitor the present position of the stolen-vehicle even when the stolen vehicle is left unattended for a long time, by keeping the communication device 26 operable while minimizing battery power consumption.

(6) If transmission of the present position to the monitor station is not successful for some reasons, for instance poor radio communication condition, the transmission is retried a predetermined number of times so that it is transmitted successfully in the end. If the transmission cannot be completed successfully in the predetermined number of times (YES at S300 and S310), the retrial is stopped. It is more reasonable to restart the transmission later, because such a failure of transmissions in the predetermined number of times often arises due to poor radio communication condition which will require a certain time period to improve.

The above embodiment may be modified as follows.

(a) The power supply to the communication device 26 from the vehicle-mounted battery may be stopped after a predetermined time period from the turning off of the ignition switch. Thus, the communication device 26 is enabled to transmit the final position of the stolen-vehicle to the monitor station 47 without fail each time the stolen-vehicle is left unattended. Even if no response is made from the vehicle-mounted device 1 in response to the call from the monitor station 47 after the predetermined time period, the monitor station 47 can recognize that the stolen-vehicle is left at the last reported position.

Another battery may be provided, in addition to the normal storage battery, for the above temporary operation of the communication device 26 after turning off the ignition switch. This additional battery may be of a small storage capacity.

(b) The position detection unit 10 may only include the GPS receiver 2. The position detection unit 10 may be replaced with other devices which are capable of specifying the position of a vehicle from time to time. For instance, the present position may be specified by the control unit 30 by retrieving position information from beacons or the like provided along roadsides. Further, cellular phones or personal handy terminals may be used to specify the present position.

(c) Still further, the remote vehicle monitoring system may be used for monitoring a specified vehicle other than the stolen one.

What is claimed is:

1. A vehicle-mounted device for a remote vehicle monitoring system having an external monitor station, the device comprising:

position specifying means for specifying a present position of a vehicle;

communication means for radio-communicating with the external monitor station by using a car phone; and control means for controlling radio communication of the present position between the communication means and the monitor station, wherein the control means is constructed to check an opponent of communication when receiving a call in the course of communication of the communication means, and wherein the control means is constructed to interrupt communication between the communication means and the opponent when the opponent is other than the monitor station and connect the communication means to the monitor station in response to a call from the monitor station, even when the communication means is in the course of communication with the opponent other than the monitor station.

2. The vehicle-mounted device as in claim 1, wherein the control means is constructed to reject manual operations on the communication means which impedes continuation of the communication between the communication means and the monitor station, when the communication means and the monitor station is in communication operation.

3. The vehicle-mounted device as in claim 1, wherein control means is constructed to reject manual operation on the communication means for sending an outgoing call until a vehicle monitor mode is cancelled, once the vehicle monitor mode is set in response to an instruction from the monitor station.

4. A vehicle-mounted device for a remote vehicle monitoring system having an external stolen-vehicle monitor station, the device comprising:

position specifying means for specifying a present position of a vehicle;

communication means for radio-communicating with the external monitor station by using a car phone; and control means for controlling radio communication of the present position between the communication means and the stolen-vehicle monitor station, wherein the control means is constructed to automatically set an operation mode thereof to a stolen-vehicle monitoring mode in response to an occurrence of a vehicle theft, interrupt communication between the communication means and an opponent when the opponent is other than the stolen-vehicle monitor station even when the communication means is in the course of communication with the opponent other than the monitor station, reject an instruction for generating a call to an external side until the stolen-vehicle monitoring mode is cancelled, and connect the communication means to the stolen-vehicle monitor station to transmit the present position of the stolen-vehicle to the stolen-vehicle monitor station.

5. The vehicle-mounted device as in claim 4, wherein the control means is constructed to transmit the present position of the stolen-vehicle to the stolen-vehicle monitor station in response to a call from the stolen-vehicle monitor station.

6. The vehicle-mounted device as in claim 4, further comprising:

emergency instruction means for generating an emergency instruction, wherein the control means is constructed to transmit an emergency rescue signal to the stolen-vehicle monitor station in response to the emergency instruction from the emergency instruction means even in the stolen-vehicle monitoring mode.

7. The vehicle-mounted device as in claim 4, wherein the control means is constructed to repeat transmitting the present position at predetermined intervals until the stolen-vehicle monitoring mode is cancelled, when the communication between the communication means and the stolen-vehicle monitor station is interrupted in the stolen-vehicle monitoring mode.

8. The vehicle-mounted device as in claim 4, wherein the control means is constructed to reject the instruction of generating the call to the external side and retry transmitting the present position until the stolen-vehicle monitoring mode is cancelled, when the communication between the communication means and the stolen-vehicle monitor station is unsuccessful in the stolen-vehicle monitoring condition due to poor radio communication condition.

9. The vehicle-mounted device as in claim 4, further comprising:

a storage battery for supplying electric power in a vehicle, wherein the communication means and the control means is held operable with the electric power of the storage battery for at least a predetermined period after a supply of the electric power of the storage battery to the vehicle is interrupted, and wherein the control means is constructed to transmit the present position during the predetermined period.

10. The vehicle-mounted device as in claim 4, further comprising:

a storage battery for supplying electric power in a vehicle, wherein the communication means is held operable with the electric power of the storage battery to receive a call from the stolen-vehicle monitor station after a supply of the electric power of the storage battery to the vehicle is interrupted, and wherein the communication means is constructed to transmit the present position in response to the call from the stolen-vehicle monitor station.

11. A vehicle monitoring system comprising:

a monitor station for radio communication; and a vehicle-mounted device mounted in a vehicle for radio communication with external phones one of which is provided in the monitor station, wherein the vehicle-mounted device has position specifying means for specifying a present position of the vehicle, communication means for communicating with the external phones, and control means for controlling communication between the communication means and the monitor station, wherein the control means is constructed to check an opponent of communication when receiving a call in the course of communication of the communication means, and wherein the control means is constructed to interrupt communication between the communication means and the opponent when the opponent is other than the monitor station and connect the communication means to the monitor station in response to a call from the monitor station, even when the communication means is in the course of communication with the opponent other than the monitor station.

12. The vehicle monitoring system as in claim 11, wherein:

the vehicle-mounted device further has theft detecting means for detecting a vehicle theft; and the control means transmits the present position of the vehicle to the monitor station upon detection of the vehicle theft.

13. The vehicle monitoring system as in claim 12, wherein:

the vehicle-mounted device further has a storage battery; and the theft detecting means is held operable by the storage battery even after a supply of electric power of the storage battery is interrupted to stop operation of the vehicle.

* * * * *

UNITED STATES PATENT AND TRADEMARK OFFICE
CERTIFICATE OF CORRECTION

PATENT NO. : 6,608,553 B2
DATED : August 19, 2003
INVENTOR(S) : Norihiro Isobe

It is certified that error appears in the above-identified patent and that said Letters Patent is hereby corrected as shown below:

<u>Title page,</u>
Insert Item -- [74] *Attorney, Agent, or Firm*, Posz & Bethards, PLC --

Signed and Sealed this

Sixteenth Day of December, 2003

JAMES E. ROGAN
*Director of the United States Patent and Trademark Office*